US00RE41874E

(19) United States
(12) Reissued Patent
Hashizume

(10) Patent Number: US RE41,874 E
(45) Date of Reissued Patent: Oct. 26, 2010

(54) METHOD OF MANUFACTURING REFLECTIVE MIRROR, ILLUMINATION DEVICE, AND PROJECTOR

(75) Inventor: Toshiaki Hashizume, Okaya (JP)

(73) Assignee: Seiko Epson Corporation, Tokyo (JP)

(21) Appl. No.: 12/318,817

(22) Filed: Jan. 8, 2009

Related U.S. Patent Documents

Reissue of:
(64) Patent No.: 7,159,990
Issued: Jan. 9, 2007
Appl. No.: 10/916,603
Filed: Aug. 12, 2004

(30) Foreign Application Priority Data

Aug. 18, 2003 (JP) ..... 2003-294675

(51) Int. Cl.
*G03B 21/28* (2006.01)
*G03B 21/00* (2006.01)
*H01J 9/00* (2006.01)
*H01J 5/16* (2006.01)
*F21S 8/00* (2006.01)

(52) U.S. Cl. ..... 353/98; 353/99; 353/121; 445/26; 313/113; 362/263

(58) Field of Classification Search ..... 353/98
See application file for complete search history.

(56) References Cited

U.S. PATENT DOCUMENTS 3,379,868 A * 4/1968 Taillon ..... 362/263
4,138,621 A * 2/1979 Downing et al. ..... 313/113
6,354,901 B1 * 3/2002 Bundo et al. ..... 445/26
6,356,700 B1 3/2002 Strobl ..... 385/147
7,040,768 B2 * 5/2006 Fujisawa et al. ..... 353/99

FOREIGN PATENT DOCUMENTS

| | | |
|---|---|---|
| JP | A-52-22061 | 2/1977 |
| JP | A-09-120067 | 5/1977 |
| JP | A-55-101417 | 8/1980 |
| JP | A-59-156927 | 9/1984 |
| JP | A-05-62595 | 3/1993 |
| JP | A-06-339981 | 12/1994 |
| JP | A-08-281691 | 10/1996 |
| JP | A-09-254271 | 9/1997 |
| JP | A-11-143378 | 5/1999 |
| JP | A-2000-173313 | 6/2000 |
| JP | A-2000-298213 | 10/2000 |
| JP | A-2000-347293 | 12/2000 |
| JP | A-2002-90883 | 3/2002 |
| JP | A-2002-154837 | 5/2002 |

* cited by examiner

*Primary Examiner*—Melissa J Koval
(74) *Attorney, Agent, or Firm*—Oliff & Berridge, PLC

(57) ABSTRACT

A reflective mirror manufacturing method for manufacturing a reflective mirror used in an illumination device including an arc tube including a light-emitting portion and a reflective mirror including a reflective surface that reflects light from the light-emitting portion in a predetermined direction, includes: a first step of forming a tube by heating a tube including a material of the reflective mirror, thereafter putting the tube in a form block, applying internal pressure with an inert gas to cause a center portion of the tube to expand, so that part of an inner surface of the expanded center portion includes a shape corresponding to the reflective surface of the reflective mirror; a second step of cutting the tube at the center portion to form a reflective mirror member; and a third step of forming a reflective layer on an inner surface of the reflective mirror member.

17 Claims, 8 Drawing Sheets

METHOD OF MANUFACTURING REFLECTIVE MIRROR, ILLUMINATION DEVICE, AND PROJECTOR

Matter enclosed in heavy brackets [ ] appears in the original patent but forms no part of this reissue specification; matter printed in italics indicates the additions made by reissue.

BACKGROUND

Exemplary aspects of the present invention relate to a method of manufacturing reflective mirror, an illumination device and a projector.

Related art projectors realize image display by modulating, in accordance with image information using a liquid crystal panel, illumination light emitted from an illumination optical system and projecting the modulated light onto a projection surface, such as a screen.

The illumination optical system is disposed with an arc tube including a light-emitting portion and a reflector including a reflective surface that reflects the light from the light-emitting portion of the arc tube in a predetermined direction. It is preferable for the illumination device to be able to use, as effectively as possible, the light from the arc tube.

For this reason, a related art parabolic reflector including a concave surface configured by a paraboloid of revolution is used as the reflector. See JP-A-2000-298213. FIG. 4 is a schematic showing an example of an optical system of a related art projector using such a parabolic reflector. As shown in FIG. 4, a parabolic reflector 930A is used, and by disposing a light emission center of an arc tube 920A in the focal position of the parabolic reflector 930A, the light emitted from the arc tube 920A can be made into substantially parallel light. Thus, the light emitted from the arc tube can be used effectively.

An ellipsoidal reflector including a concave surface configured by an ellipsoid of revolution is also used as the reflector. See JP-A-2002-90883. FIG. 5 is a schematic showing an example of an optical system of a projector 900B using such an ellipsoidal reflector. As shown in FIG. 5, an ellipsoidal reflector 930B is used, and by disposing the light emission center of an arc tube 920B in one focal point (first focal point) of the ellipsoidal reflector 930B, the light emitted from the arc tube 920B can be effectively focused at another focal point (second focal point) of the ellipsoidal reflector 930B. Thus, the light emitted from the arc tube can be used effectively.

FIG. 6 is a schematic showing another example of an optical system 901C of a projector 900C using such an ellipsoidal mirror. As shown in FIG. 6, an ellipsoidal reflector 930C is used, and by disposing the light emission center of an arc tube 920C in one focal point (first focal point) of the ellipsoidal reflector 930C and disposing a parallelizing lens 945 to make parallel the emission light from the ellipsoidal reflector 930C, the light emitted from the arc tube 920C can be made into substantially parallel light. Thus, the light emitted from the arc tube can be used effectively. See JP-A-2000-347293.

Such reflectors are usually manufactured by press molding. FIG. 7 is a schematic showing a related art reflector manufacturing method for explanation.

In the related art reflector manufacturing method, as shown in FIG. 7, a reflector 930D is molded using a form block 930M disposed with a lower mold 931 including a concave cavity, a press mold 932 disposed so as to surround the periphery of the cavity of the lower mold 931, and a core 933 that slides the inside of a slide-use opening of the press mold 932 towards the inside of the cavity of the lower mold 931. Specifically, a softened glass material is supplied to the inside of the cavity of the lower mold 931, the glass material is pressurized by sliding the core 933, and the glass material spreads and fills the inside of the form block 930M. Thus, reference surfaces 937 and 939 are formed by the press mold 932, and a reflective surface 935 is formed by the core 933.

SUMMARY

However, in this related art reflector manufacturing method, when the continuous production quantity increases, the surface of the form block is abraded and the reflector material adheres to the surface of the form block, whereby the state of the surface of the form block deteriorates. For this reason, there have been problems that the characteristics of the reflective surface of the reflector to be manufactured deteriorate, the light use efficiency drops and the manufacturing cost rises.

Among illumination devices, there is an illumination device that includes, in addition to an arc tube 920E and a reflector 930E, an auxiliary mirror 940 that reflects, towards the arc tube 920E, light emitted from the arc tube 920E to an illuminated region. See JP-A-11-143378. FIG. 8 is a schematic showing an illumination device 910E including such an auxiliary mirror 940. As shown in FIG. 8, an auxiliary mirror 940 is also ordinarily manufactured by press molding.

For this reason, even with respect to the auxiliary mirror 940, when the continuous production quantity increases, the surface of the form block is abraded and the auxiliary mirror material adheres to the surface of the form block, whereby the state of the surface of the form block deteriorates. For this reason, there have been problems that the characteristics of the reflective surface of the auxiliary mirror to be manufactured deteriorates, the light use efficiency drops and the manufacturing cost rises.

Thus, exemplary aspects of the present invention have been made in order to address and/or eliminate the above-described and/or other problems, and provides a reflective mirror manufacturing method for manufacturing a reflective mirror, such as a reflector and an auxiliary mirror, so that even if the continuous production quantity increases, the characteristics of the reflective surface of the reflective mirror to be manufactured do not deteriorate, the light use efficiency does not drop and the manufacturing cost does not rise.

Exemplary aspects of the present invention also provide, at an inexpensive manufacturing cost, an illumination device and a projector including an excellent reflective mirror whose light use efficiency is high.

Exemplary aspects of the present invention provide a reflective mirror manufacturing method for manufacturing a reflective mirror used in an illumination device including an arc tube including a light-emitting portion and a reflective mirror including a reflective surface that reflects light from the light-emitting portion in a predetermined direction. The method includes: a first step of forming a tube by heating a tube consisting of a material of the reflective mirror, thereafter putting the tube in a form block, applying internal pressure with an inert gas to cause a center portion of the tube to expand, so that part of an inner surface of the expanded center portion includes a shape corresponding to the reflective surface of the reflective mirror; a second step of cutting the tube at the center portion to form a reflective mirror member; and a third step of forming a reflective layer on an inner surface of the reflective mirror member.

For this reason, according to the reflective mirror manufacturing method of an exemplary aspect of the invention, a form block to form the reflective surface of the reflective mirror becomes unnecessary because the tube is formed by applying internal pressure with an inert gas to cause a center portion of the tube to expand, so that the tube has a shape corresponding to the reflective surface of the reflective mirror. As a result, even if the continuous production quantity of the reflective mirror increases, the situation where the surface of the form block is abraded and the reflective mirror material adheres to the surface of the form block is reduced or eliminated. For this reason, even if the continuous production quantity of the reflective mirror increases, the situation where the state of the surface of the form block deteriorates is eliminated, and the situation where the characteristics of the reflective surface of the reflective mirror to be manufactured deteriorate, the light use efficiency drops and the manufacturing cost rises is reduced or eliminated. Thus, it becomes possible to manufacture, at an inexpensive manufacturing cost, a reflective mirror whose light use efficiency is high.

Also, according to the reflective mirror manufacturing method of an exemplary aspect of the invention, because internal pressure is applied with an inert gas to cause the center portion of the tube to expand, so that a tube is formed having a shape corresponding to the reflective surface of the reflective mirror, the inner surface of the reflective mirror member contacts only the inert gas. Thus, a smooth reflective surface, whose surface roughness is extremely small, can be obtained as the reflective surface of the reflective mirror.

For this reason, according to the reflective mirror manufacturing method of an exemplary aspect of the invention, it becomes possible to manufacture, at an inexpensive manufacturing cost, a smooth reflective mirror whose surface roughness is extremely small and whose light use efficiency is high.

Also, according to the reflective mirror manufacturing method of an exemplary aspect of the invention, because that which contacts the form block is the outer surface of the reflective mirror member, affects such as mold marks do not appear in the reflective surface of the reflective mirror. Thus, there is also the effect that a reflective mirror having characteristics that are stable from the initial manufacture to the end of the mold life can be manufactured.

In the reflective mirror manufacturing method of an exemplary aspect of the invention, in the first step, the tube may be molded to have a shape where two reflective mirror members mutually face each other, and in the second step, the two reflective mirror members may be formed.

By configuring an exemplary aspect of the invention in this manner, it becomes possible to form two reflective mirrors from one tube, and it becomes possible to further reduce the manufacturing cost of the reflective mirror.

In this case, it is also easy to make the two reflective mirrors have exactly the same shape, so that in this case, it becomes possible to further reduce the manufacturing cost.

In the reflective mirror manufacturing method of an exemplary aspect of the invention, the reflective mirror may be a reflective mirror disposed with an effective reflective surface in a range from a portion of at least 40° with respect to an optical axis of the reflective mirror, using a light emission center of the light-emitting portion as a reference, to an open end portion of the reflective mirror.

Usually, arc tubes, such as high-pressure mercury lamps and metal halide lamps include a light distribution characteristic such that the brightness of the light, emitted in a range of 40° to 140° with respect to an extension-direction axis of seal portions extending from both ends of the arc tube, becomes relatively high. Also, in illumination devices, usually the optical axis of the reflective mirror, such as a reflector or auxiliary mirror, coincides with the extension-direction axis of the seal portions of the arc tube. For this reason, according to the reflective mirror manufacturing method of an exemplary aspect of the invention, because a reflective mirror is manufactured that has an effective reflective surface in a range from a portion of at least 40° with respect to the optical axis of the reflective mirror, using the light emission center of the light-emitting portion as a reference, to an open end portion of the reflective mirror, the reflective mirror can be made into a reflective mirror having a reflectance characteristic matching the light distribution characteristic of the arc tube, and the use efficiency of the light emitted from the arc tube can be raised.

Exemplary aspects of the invention also provide an illumination device including an arc tube including a light-emitting portion and a reflector that reflects light from the light-emitting portion to an illuminated region. The reflector is a reflective mirror manufactured by the reflective mirror manufacturing method of an exemplary aspect of the invention.

For this reason, according to the illumination device of an exemplary aspect of the invention, as described above, the illumination device is inexpensive and has a light use efficiency that is high because the illumination device includes the reflector that is inexpensive and has a light use efficiency that is high.

Exemplary aspects of the invention also provide an illumination device including an arc tube including a light-emitting portion, a reflector that reflects light from the light-emitting portion to an illuminated region, and an auxiliary mirror that is disposed facing the reflector with the light-emitting portion sandwiched therebetween and which reflects part of the light emitted from the light-emitting portion towards the light-emitting portion. The auxiliary mirror is a reflective mirror manufactured by the reflective mirror manufacturing method of an exemplary aspect of the invention.

For this reason, according to the illumination device of an exemplary aspect of the invention, as described above, the illumination device is inexpensive and has a light use efficiency that is high because the illumination device includes the auxiliary mirror that is inexpensive and has a light use efficiency that is high.

In the illumination device of an exemplary aspect of the invention, in addition to the auxiliary mirror, the reflector may also be a reflective mirror manufactured by the reflective mirror manufacturing method of an exemplary aspect of the invention.

By configuring an exemplary aspect of the invention in this manner, as described above, in addition to including the auxiliary mirror that is inexpensive and has a light use efficiency that is high, the illumination device is even more inexpensive and has a higher light use efficiency because it includes a reflector that is inexpensive and has a light use efficiency that is high.

Exemplary aspects of the invention also provide a projector including: an illumination optical system including the illumination device of an exemplary aspect of the invention; an electro-optical modulation device that modulates light from the illumination optical system in accordance with image information; and a projection optical system that projects the light modulated by the electro-optical modulation device.

For this reason, according to the projector of an exemplary aspect of the invention, as described above, the projector is inexpensive and has a light use efficiency that is high because the projector is disposed with the illumination device that is inexpensive and has a light use efficiency that is high.

DETAILED DESCRIPTION OF EXEMPLARY EMBODIMENTS

Figure 1:
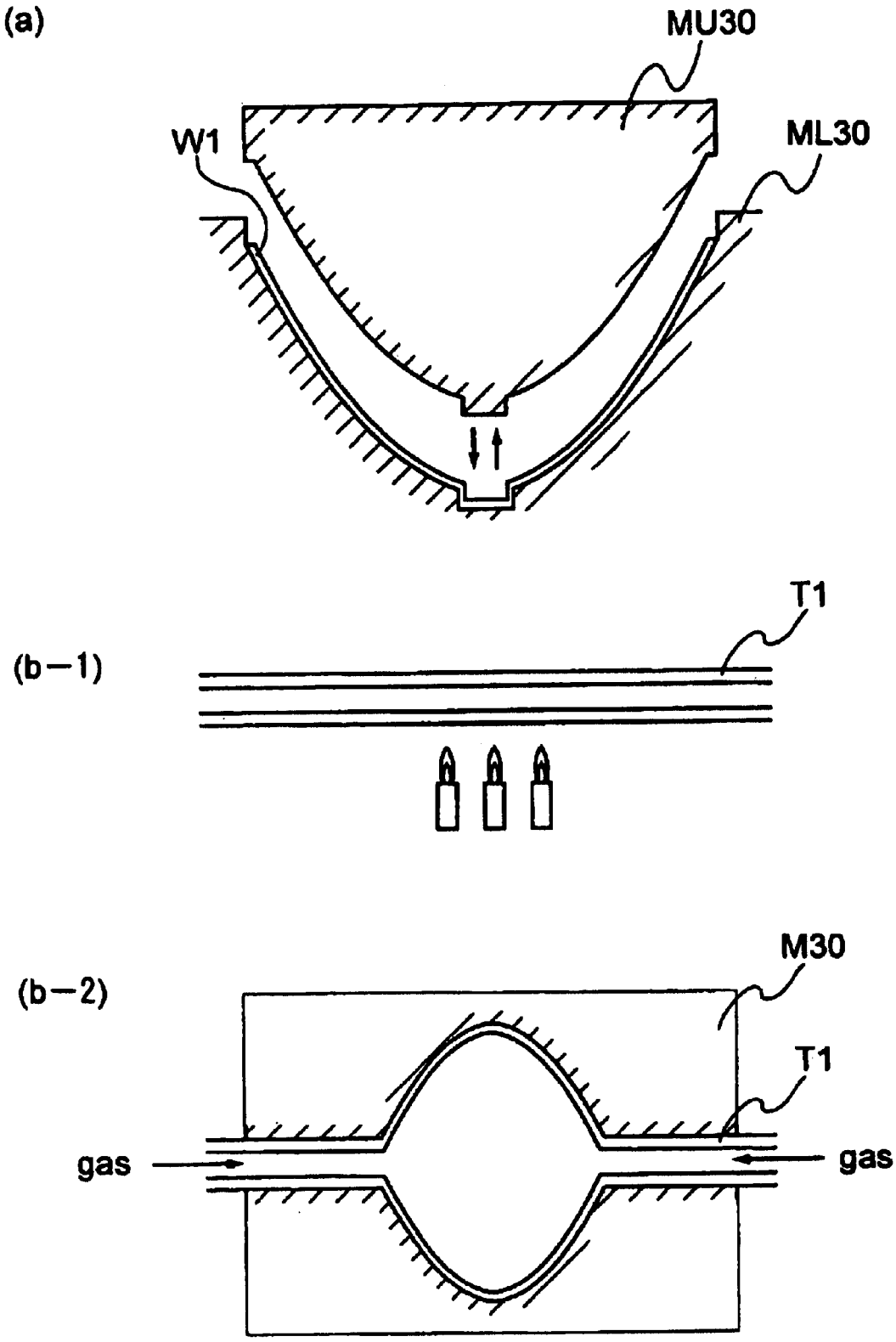
FIGS. 1(a)–(b-2) are schematics for describing a reflector manufacturing method pertaining to a first exemplary embodiment.

A method of manufacturing reflective mirror, an illumination device and a projector of exemplary aspects of the present invention will be described below on the basis of exemplary embodiments shown in the drawings.

First Exemplary Embodiment

A first exemplary embodiment will be described using a reflector manufacturing method as an example of the reflective mirror manufacturing method of an exemplary aspect of the invention.

FIGS. 1(a)–(b-2) are schematics for describing the reflector manufacturing method pertaining to the first exemplary embodiment. FIG. 1(a) is a schematic for describing a reflector manufacturing method (press molding) pertaining to a comparative example, and FIG. 1(b) are diagrams for describing the reflector manufacturing method (gas pressure molding) pertaining to the first exemplary embodiment.

As shown in FIG. 1(a), the reflector manufacturing method (press molding) pertaining to the comparative example includes conducting press molding in a state where a reflector material W1 is put between an upper mold MU30 and a lower mold ML30 having desired shapes. For this reason, according to the reflector manufacturing method pertaining to the comparative example, a high-precision reflector can be relatively easily manufactured using the high-precision upper mold MU30.

However, in the reflector manufacturing method pertaining to the comparative example, when the continuous production quantity increases, the surface of the upper mold MU30 is abraded and the reflector material W1 adheres to the surface of the upper mold MU30, whereby the state of the surface of the upper mold MU30 deteriorates. For this reason, there have been problems that the characteristics of the reflective surface of the reflector to be manufactured deteriorate and the light use efficiency drops.

The reflector manufacturing method (gas pressure molding) pertaining to the first exemplary embodiment includes: a first heating part of a tube T1 including a reflector material as shown in FIG. 1(b-1), thereafter putting the tube T1 in a form block M30, applying internal pressure with an inert gas to cause the center portion of the tube T1 to expand as shown in FIG. 1(b-2) so that part of the expanded inner surface includes a shape corresponding to the reflective surface of the reflector to be manufactured; a second step (not shown) of cutting the tube T1 at the center portion and both ends to form a reflector member; and a third step (not shown) of forming a reflective layer by forming a derivative multilayer film, such as $TiO_2$ and $SiO_2$, on the inner surface of the reflector material by vapor deposition, sputtering or CVD.

For this reason, according to the reflector manufacturing method pertaining to the first exemplary embodiment, because internal pressure is applied with an inert gas to cause the center portion of the tube to expand, so that a tube is formed having a shape corresponding to the reflective surface of the reflector, a form block to form the reflective surface of the reflector becomes unnecessary. As a result, even if the continuous production quantity of the reflector increases, the situation where the surface of the form block is abraded and the reflector material adheres to the surface of the form block is eliminated. For this reason, even if the continuous production quantity of the reflector increases, the situation where the state of the surface of the form block deteriorates is eliminated, and the situation where the characteristics of the reflective surface of the reflective mirror to be manufactured deteriorate, the light use efficiency drops and the manufacturing cost rises is eliminated. Thus, it becomes possible to manufacture, at an inexpensive manufacturing cost, an excellent reflective mirror whose light use efficiency is high.

Also, according to the reflector manufacturing method pertaining to the first exemplary embodiment, because internal pressure is applied with an inert gas to cause the center portion of the tube to expand, so that a tube is formed having a shape corresponding to the reflective surface of the reflector, the inner surface of the reflector member contacts only the inert gas. Thus, a smooth reflective surface whose surface roughness is extremely small can be obtained as the reflective surface of the reflector.

For this reason, according to the reflector manufacturing method pertaining to the first exemplary embodiment, it becomes possible to manufacture, at an inexpensive manufacturing cost, a smooth reflector whose surface roughness is extremely small and whose light use efficiency is high.

Also, according to the reflector manufacturing method pertaining to the first exemplary embodiment, because that which contacts the form block is the outer surface of the reflector material, affects, such as mold marks, do not appear in the reflective surface of the reflector. Thus, there is also the effect that a reflector having characteristics that are stable from the initial manufacture to the end of the mold life can be manufactured.

In the reflector manufacturing method pertaining to the first exemplary embodiment, in the first step, as shown in FIG. 1(b-2), the tube T1 is molded to have a shape where two reflector members mutually face each other, and in the second step, the two reflector members are formed (not shown).

For this reason, it becomes possible to form two reflectors with the same shape from one tube T1, and it becomes possible to further reduce the manufacturing cost of the reflector.

In the reflector manufacturing method pertaining to the first exemplary embodiment, the reflector is a reflector disposed with an effective reflective surface in a range from a portion of at least 40° with respect to the optical axis of the reflector, using the light emission center of a light-emitting portion as a reference, to an open end portion of the reflector.

Usually, arc tubes, such as high-pressure mercury lamps and metal halide lamps, include a light distribution characteristic such that the brightness of the light emitted in a range of 40° to 140° with respect to an extension-direction axis of seal portions extending from both ends of the arc tube becomes relatively high. Also, in illumination devices, usually the optical axis of the reflector coincides with the extension-direction axis of the seal portions of the arc tube. For this reason, according to the reflector manufacturing method pertaining to the first exemplary embodiment, because a reflector is manufactured that has an effective reflective surface in a range from a portion of at least 40° with respect to the optical axis of the reflector, using the light emission center of a light-emitting portion as a reference, to an open end portion of the reflector, the reflector can be made into a reflector having a reflectance characteristic matching the light distribution characteristic of the arc tube, and the use efficiency of the light emitted from the arc tube can be raised.

Hard glass and quartz glass are suitable as the material of the tube T1. Among these, quartz glass is particularly suitable. This is because the coefficient of thermal expansion is low, and therefore internal warps do not remain, so that annealing is not necessary.

In the reflector manufacturing method pertaining to the first exemplary embodiment, an excellent reflective surface is obtained and the inner surface of the reflector can always maintain a high reflectance because the inner surface of the glass tube, excellently managed by the mold at the time of removal ordinarily, becomes a departure shape.

In this manner, according to the reflector manufacturing method pertaining to the first exemplary embodiment, it becomes possible to manufacture, at an inexpensive manufacturing cost, a smooth reflector whose surface roughness is extremely small and whose light use efficiency is high.

For this reason, by using, in an illumination device or projector, the reflector manufactured by the reflector manufacturing method pertaining to the first exemplary embodiment, it becomes possible to manufacture, at an inexpensive manufacturing cost, an excellent illumination device and projector whose light use efficiency is high.

Second Exemplary Embodiment

A second exemplary embodiment will be described using an auxiliary mirror manufacturing method as an example of the reflective mirror manufacturing method of an exemplary aspect of the invention.

Figure 2:
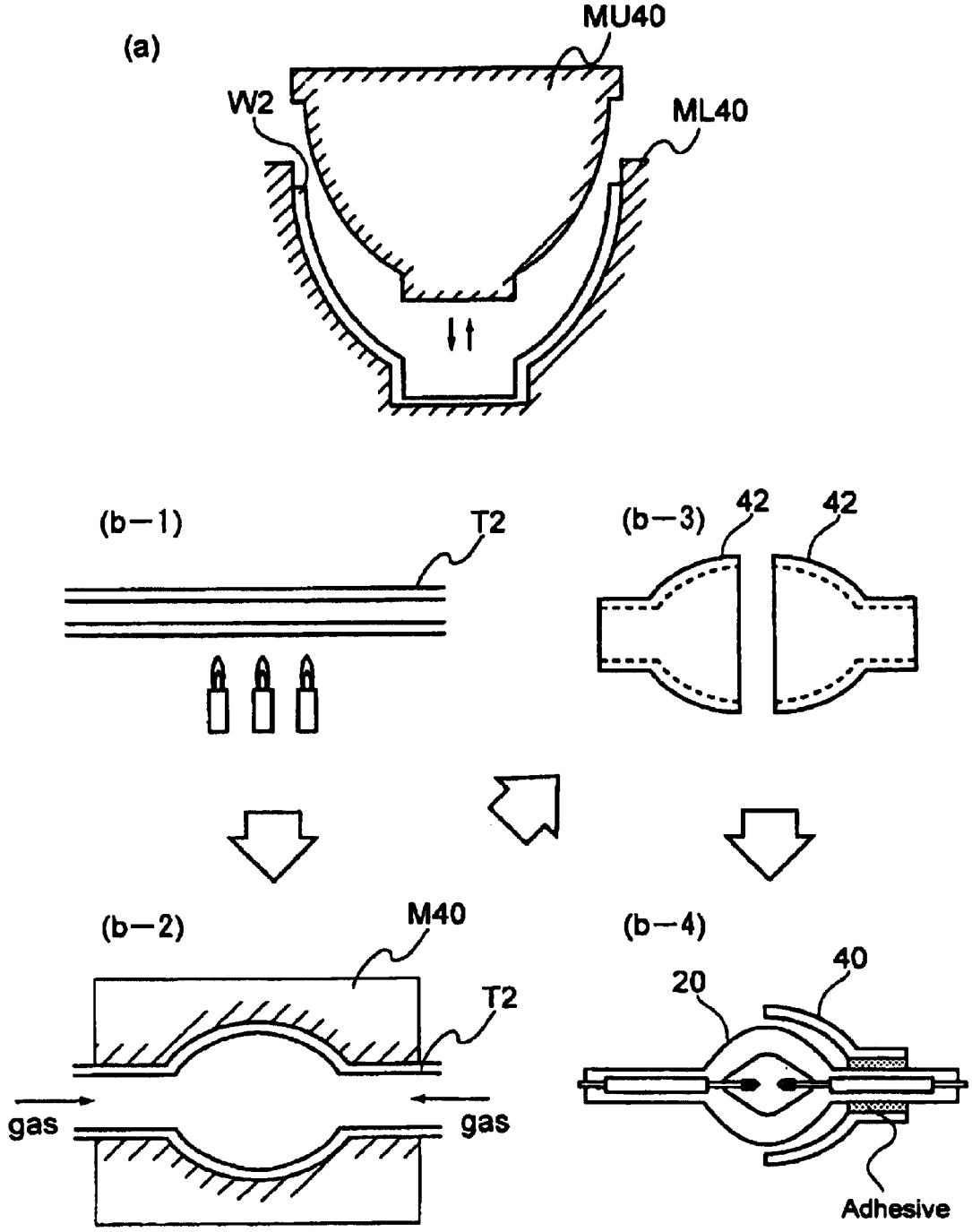
FIGS. 2(a)–(b-4) are schematics for describing an auxiliary mirror manufacturing method pertaining to a second exemplary embodiment.

FIGS. 2(a)–(b-4) are schematics for describing the auxiliary mirror manufacturing method pertaining to the second exemplary embodiment. FIG. 2(a) is schematic for describing an auxiliary mirror manufacturing method (press molding) pertaining to a comparative example, and FIGS. 2(b-1)–(b-4) are schematics for describing the auxiliary mirror manufacturing method (gas pressure molding) pertaining to the second exemplary embodiment.

As shown in FIG. 2(a), the auxiliary mirror manufacturing method (press molding) pertaining to the comparative example includes conducting press molding in a state where an auxiliary mirror material W2 is put between an upper mold MU40 and a lower mold ML40 having desired shapes. For this reason, according to the auxiliary mirror manufacturing method pertaining to the comparative example, a high-precision auxiliary mirror can be relatively easily manufactured using the high-precision upper mold MU40.

However, in the auxiliary mirror manufacturing method pertaining to the comparative example, when the continuous production quantity increases, the surface of the upper mold MU40 is abraded and the auxiliary mirror material W2 adheres to the surface of the upper mold MU40, whereby the state of the surface of the upper mold MU40 deteriorates. For this reason, there have been problems that the characteristics of the reflective surface of the auxiliary mirror to be manufactured deteriorate and the light use efficiency drops.

The auxiliary mirror manufacturing method (gas pressure molding) pertaining to the second exemplary embodiment includes: a first step of heating part of a tube T2 including quartz glass, which is an auxiliary mirror material, as shown in FIG. 2(b-1), thereafter putting the tube T2 in a form block M40, applying internal pressure with an inert gas to cause the center portion of the tube T2 to expand as shown in FIG. 2(b-2) so that part of the expanded inner surface includes a shape corresponding to the reflective surface of the auxiliary mirror to be manufactured; a second step of cutting the tube T2 at the center portion and both ends to form an auxiliary mirror member as shown in FIG. 2(b-3); and a third step (not shown) of forming a reflective layer by forming a derivative multilayer film, such as $TiO_2$ and $SiO_2$, on the inner surface of the auxiliary mirror member by vapor deposition, sputtering or CVD.

FIG. 2(b-4) is a schematic where the auxiliary mirror manufactured by the auxiliary mirror manufacturing method pertaining to the second exemplary embodiment is fixed to an arc tube using an adhesive. A ceramic adhesive that can withstand high temperatures is used as the adhesive.

For this reason, according to the auxiliary mirror manufacturing method pertaining to the second exemplary embodiment, because internal pressure is applied with an inert gas to cause the center portion of the tube to expand, so that a tube is formed having a shape corresponding to the reflective surface of the auxiliary mirror, a form block to form the reflective surface of the auxiliary mirror becomes unnecessary. As a result, even if the continuous production quantity of the auxiliary mirror increases, the situation where the surface of the form block is abraded and the auxiliary mirror material adheres to the surface of the form block is eliminated. For this reason, even if the continuous production quantity of the auxiliary mirror increases, the situation where the state of the surface of the form block deteriorates is eliminated, and the situation where the characteristics of the reflective surface of the auxiliary mirror to be manufactured deteriorate, the light use efficiency drops and the manufacturing cost rise is eliminated. Thus, it becomes possible to manufacture, at an inexpensive manufacturing cost, an excellent auxiliary mirror whose light use efficiency is high.

Also, according to the auxiliary mirror manufacturing method pertaining to the second exemplary embodiment, because internal pressure is applied with an inert gas to cause the center portion of the tube to expand, so that a tube is formed having a shape corresponding to the reflective surface of the auxiliary mirror, the inner surface of the auxiliary mirror member contacts only the inert gas. Thus, a smooth reflective surface whose surface roughness is extremely small can be obtained as the reflective surface of the auxiliary mirror.

For this reason, according to the auxiliary mirror manufacturing method pertaining to the second exemplary embodiment, it becomes possible to manufacture, at an inexpensive manufacturing cost, a smooth auxiliary mirror whose surface roughness is extremely small and whose light use efficiency is high.

Also, according to the auxiliary mirror manufacturing method pertaining to the second exemplary embodiment, because that which contacts the form block is the outer surface of the auxiliary mirror member, affects, such as mold marks, do not appear in the reflective surface of the auxiliary member. Thus, there is also the effect that an auxiliary mirror having characteristics that are stable from the initial manufacture to the end of the mold life can be manufactured.

Moreover, according to the auxiliary mirror manufacturing method pertaining to the second exemplary embodiment, there are the effects that the rate at which the reflection light from the reflector is blocked can be minimized and the light use efficiency can be further raised because the auxiliary mirror can be formed extremely thinly. There is also the effect that the molding of the portion fixing the auxiliary mirror to the arc tube also becomes easy.

In the auxiliary mirror manufacturing method pertaining to the second exemplary embodiment, in the first step, as shown in FIG. 2(b-2) and FIG. 2(b-3), the tube T2 is molded to have a shape where two auxiliary mirror members mutually face each other, and in the second step, two auxiliary mirror members 42 are formed.

For this reason, it becomes possible to form two auxiliary mirrors 40 with the same shape from one tube T2, and it becomes possible to further reduce the manufacturing cost of the auxiliary mirror.

In the auxiliary mirror manufacturing method pertaining to the second exemplary embodiment, the auxiliary mirror is an auxiliary mirror disposed with an effective reflective surface in a range from a portion of at least 40° with respect to the optical axis of the auxiliary member, using the light emission center of a light-emitting portion as a reference, to an open end portion of the auxiliary mirror.

Usually, arc tubes, such as high-pressure mercury lamps and metal halide lamps, include a light distribution characteristic such that the brightness of the light, emitted in a range of 40° to 140° with respect to an extension-direction axis of seal portions extending from both ends of the arc tube, becomes relatively high. Also, in illumination devices, usually the optical axis of the reflector coincides with the extension-direction axis of the seal portions of the arc tube. For this reason, according to the auxiliary mirror manufacturing method pertaining to the second exemplary embodiment, because an auxiliary mirror is manufactured that has an effective reflective surface in a range from a portion of at least 40° with respect to the optical axis of the auxiliary mirror, using the light emission center of a light-emitting portion as a reference, to an open end portion of the auxiliary mirror, the auxiliary mirror can be made into an auxiliary mirror having a reflectance characteristic matching the light distribution characteristic of the arc tube, and the use efficiency of the light emitted from the arc tube can be raised.

Hard glass and quartz glass are suitable as the material of the tube T2. Among these, quartz glass is particularly suitable. This is because the coefficient of thermal expansion is low. Therefore internal warps do not remain, so that annealing is not necessary.

In the auxiliary mirror manufacturing method pertaining to the second exemplary embodiment, an excellent reflective surface is obtained and the inner surface of the auxiliary mirror can always maintain a high reflectance because the inner surface of the glass tube excellently managed by the mold at the time of removal ordinarily becomes a departure shape.

In this manner, according to the auxiliary mirror manufacturing method pertaining to the second exemplary embodiment, it becomes possible to manufacture, at an inexpensive manufacturing cost, a smooth auxiliary mirror whose surface roughness is extremely small and whose light use efficiency is high.

For this reason, by using, in an illumination device or projector, the auxiliary mirror manufactured by the auxiliary mirror manufacturing method pertaining to the second exemplary embodiment, it becomes possible to manufacture, at an inexpensive manufacturing cost, an excellent illumination device and projector whose light use efficiency is high.

Third Exemplary Embodiment

In order to describe the effects when the reflective mirror manufactured by the reflective mirror manufacturing method of an exemplary aspect of the invention is used in an illumination device and projector, a third exemplary embodiment will be described using, as an example, a case where the reflector manufactured by the reflector manufacturing method pertaining to the first exemplary embodiment is used in a projector.

Figure 3:
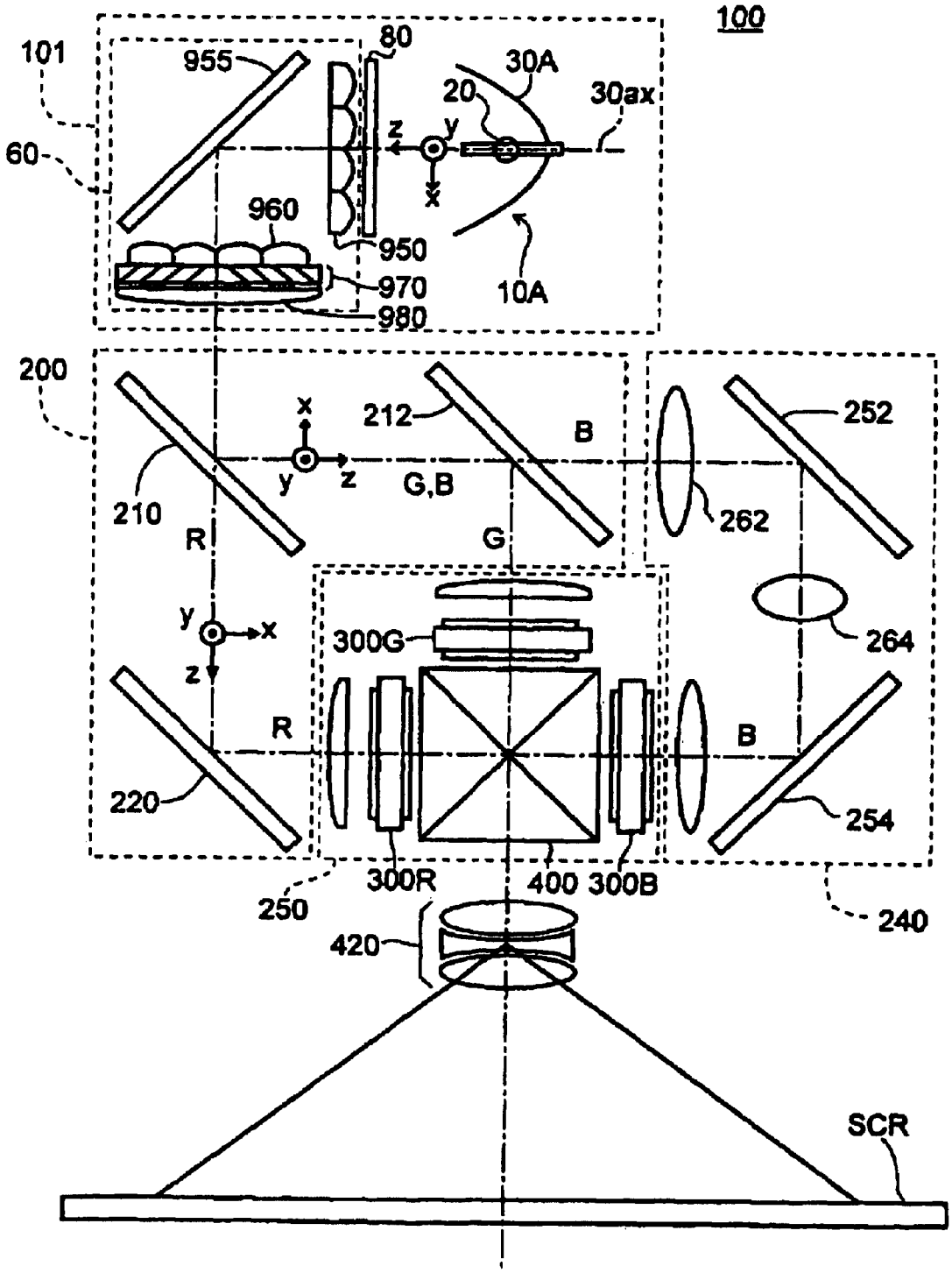
FIG. 3 is a schematic showing an optical system of a projector pertaining to a third exemplary embodiment.

FIG. 3 is a schematic showing an optical system of a projector pertaining to the third exemplary embodiment.

A projector 100 pertaining to the third exemplary embodiment is an optical device where light beams emitted from a light source are modulated in accordance with image information to form an optical image, and the optical image is enlarged and projected onto a screen SCR.

Figure 4:
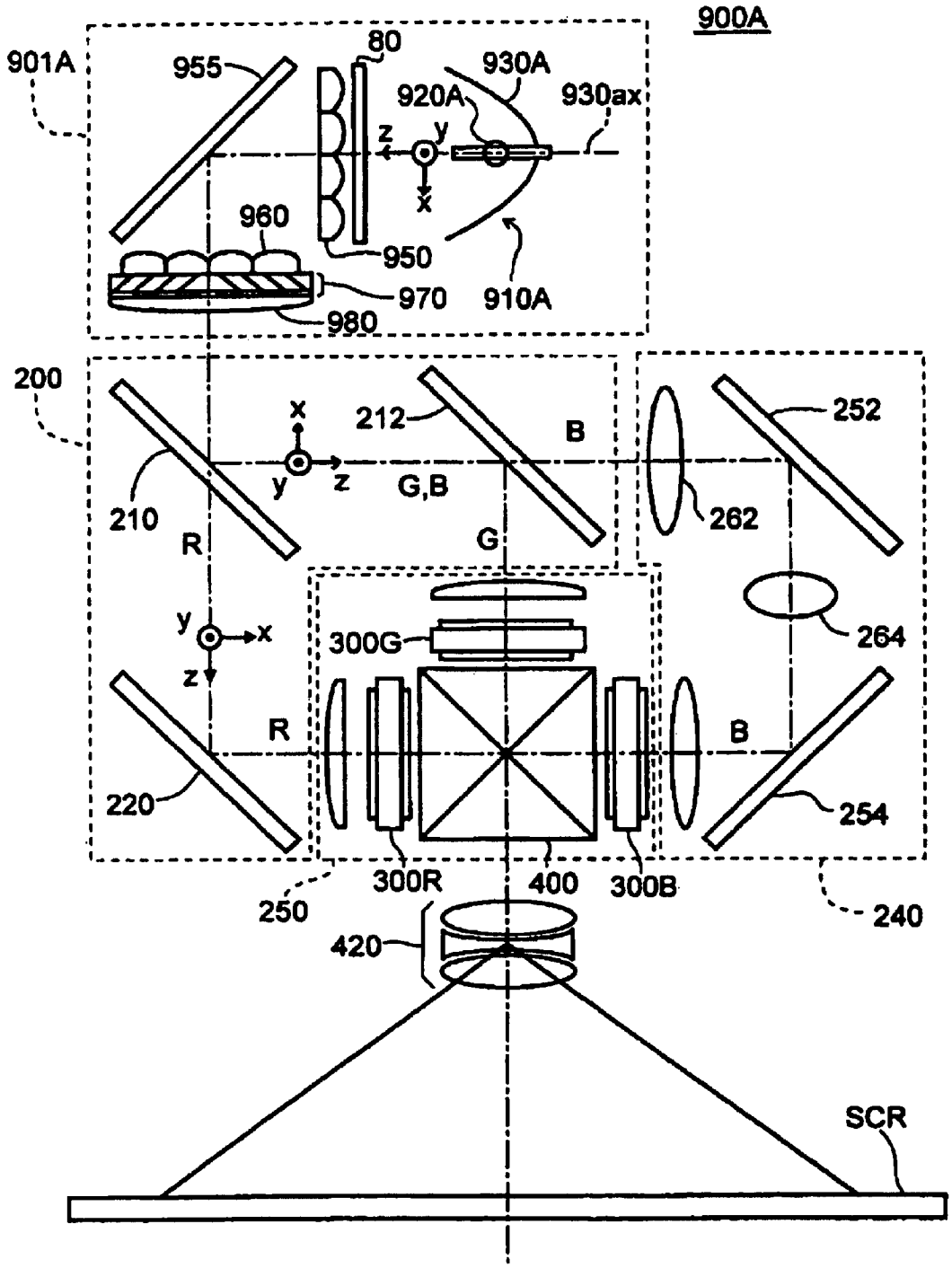
FIG. 4 is a schematic showing an example of an optical system of a projector using a parabolic reflector.

The projector 100 pertaining to the third exemplary embodiment includes an optical system that is basically the same as the optical system of a related art projector 900A shown in FIG. 4. Specifically, as shown in FIG. 3, the projector 100 pertaining to the third exemplary embodiment is disposed with an illumination optical system 101, a color light separation optical system 200, a relay optical system 240, an optical device 250 and a projection optical system 420.

The illumination optical system 101 is disposed with an illumination device 10A and an integrator optical system 60.

The illumination device 10A is disposed with a reflector 30A manufactured by the reflector manufacturing method pertaining to the first exemplary embodiment and an arc tube 20 including a light emission center at a focal position of the reflector 30A.

The arc tube 20 includes a tube and seal portions that extend at both sides of the tube. The tube is made of quartz glass formed in a spherical shape and includes a pair of electrodes disposed inside the tube, with the inside of the tube being filled with mercury, a noble gas and a small amount of halogen.

The pair of electrodes inside the tube of the arc tube 20 is to form an arc image. When a voltage is applied to the pair of electrodes, a potential difference arises between the electrodes, a discharge arises, and an arc image is generated.

Here, various kinds of arc tubes that emit light at a high brightness can be used as the arc tube. For example, a metal halide lamp, a high-pressure mercury lamp and a super high-pressure mercury lamp can be used.

The reflector 30A includes a concave surface that aligns and emits, in a constant direction, the light emitted from the arc tube 20. The concave surface of the reflector 30A is formed as a cold mirror that reflects visible light and transmits infrared light. The optical axis of the reflector 30A coincides with an optical axis 30ax that is the central axis of the light beams emitted from the illumination device 10A.

As described above, the illumination device 10A includes the arc tube 20, which includes a light-emitting portion, and the reflector 30A, which reflects the light from the light-emitting portion to an illuminated region, and the reflector 30A is a reflector manufactured by the reflector manufacturing method pertaining to the first exemplary embodiment. For this reason, as described above, the illumination device is inexpensive and has a light use efficiency that is high because the illumination device includes the reflector that is inexpensive and has a light use efficiency that is high.

The integrator optical system 60 is an optical system that separates the light beams emitted from the illumination device 10A into plural partial light beams to equalize the in-plane illuminance of the illumination region. The integrator optical system 60 is disposed with a first lens array 950, a second lens array 960, a polarization conversion element 970, a superposition lens 980 and a reflective mirror 955. An infrared reflective filter 80 is disposed on the optical path between the illumination device 10A and the first lens array 950.

The first lens array 950 includes a function as a light beam separation optical element that separates the light beams emitted from the illumination device 10A into plural partial light beams, and is disposed with plural small lenses arranged in a matrix in a plane intersecting the optical axis 30ax that is the central axis of the light beams emitted from the illumination device 10A.

The second lens array 960 is an optical element that focuses the plural partial light beams separated by the first lens array 950, and similar to the first lens array 950, includes a configuration disposed with plural small lenses arranged in a matrix in a plane intersecting the optical axis 30ax.

The polarization conversion element 970 is a polarization conversion element that emits, as substantially one kind of linearly polarized light whose polarization direction has been aligned, the polarization direction of the partial light beams separated by the first lens array 950.

Although it is not shown, the polarization conversion element 970 is disposed with a configuration where polarization separation films and reflection films disposed at an inclination with respect to the optical axis 30ax are alternately arranged. The polarization separation films transmit the polarized light beams of one of P-polarized light beams and S-polarized light beams included in the partial light beams, and reflect the other polarized light beams. The other reflected polarized light beams are bent by the reflective films and emitted in the emission direction of the one polarized light beams, i.e., in the direction along the optical axis 30ax. The polarization of either of the emitted polarized light beams is converted by a phase plate disposed in the light beam emission plane of the polarization conversion element 970. By using the polarization conversion element 970, the use efficiency of the light source light used by the optical device 250 can be raised because the light beams emitted from the illumination device 10A can be aligned into polarized light beams of substantially one direction.

The superposition lens 980 is an optical element that focuses the plural partial light beams passing through the first lens array 950, the second lens array 960 and the polarization conversion element 970, and superposes the plural partial light beams onto an image forming region of three later-described liquid crystal devices of the optical device 250.

The light emitted from the illumination optical system 101 is emitted to the color separation optical system 200 and separated into color light of the three colors of red (R), green (G) and blue (B) in the color light separation optical system 200.

The color separation optical system 200 is disposed with two dichroic mirrors 210 and 212 and a reflective mirror 220, and includes the function of using the dichroic mirrors 210 and 211 to separate, into color light of the three colors of red (R), green (G) and blue (B), the plural partial light beams emitted from the integrator optical system 60.

The dichroic mirrors 210 and 212 are optical elements where a wavelength selection film that reflects light beams of a predetermined wavelength region and transmits light beams of another wavelength region are formed on a substrate. Additionally, the dichroic mirror 210 disposed in the former stage of the optical path is a mirror that transmits red light and reflects other color light. Also, the dichroic mirror 212 disposed in the latter stage of the optical path is a mirror that reflects green light and transmits blue light.

The relay optical system 240 is disposed with an incident-side lens 262, a relay lens 264 and reflective mirrors 252 and 254, and includes the function of guiding, to the optical device 250, the blue light transmitted through the dichroic mirror 212 configuring the color separation optical system 200. The reason the relay optical system 240 is disposed in the optical path of the blue light is to reduce or prevent a drop in the use efficiency of the light resulting from diffusion of the light, because the optical path length of the blue light is longer than the optical path lengths of the other color light. Although the projector 100 pertaining to the third exemplary embodiment is configured in this manner because the optical path length of the blue light is long, a configuration is also conceivable where the optical path length of the red light is lengthened and the relay optical system 240 is used in the optical path of the red light.

After the red light separated by the dichroic mirror 210 is bent by the reflective mirror 220, it is supplied to the optical device 250 via a field lens. Also, the green light separated by the dichroic mirror 212 is supplied to the optical device 250 as is, via a field lens. Moreover, the blue light is focused and bent by the lenses 262 and 264 and the reflective mirrors 252 and 254 configuring the relay optical system 240, and is supplied to the optical device 250 via a field lens. The field lenses disposed in the former stage of the optical path of each color light of the optical device 250 are disposed in order to convert, to light beams substantially parallel to the optical axis 30ax, the partial light beams emitted from the illumination optical system 101.

The separated color light is modulated in correspondence to image information in liquid crystal devices 300R, 300G and 300B.

The optical device 250 forms a color image by modulating the incident light beams in accordance with image information. The optical device 250 is disposed with the liquid crystal devices 300R, 300G and 300B (the liquid crystal device for the red light is 300R, the liquid crystal device for the green light is 300G, and the liquid crystal device for the blue light is 300B) and a cross dichroic prism 400. Here, each of the liquid crystal devices 300R, 300G and 300B is configured by a liquid crystal panel corresponding to an electro-optical modulation device of an exemplary aspect of the invention and polarization plates disposed at the light-incident surface side and the light-emission surface side of the liquid crystal panel. Light modulation of each color light made incident is conducted by the incident-side polarization plates, the liquid crystal panels and the emission-side polarization plates.

The liquid crystal panels are panels where liquid crystal, which is an electro-optical substance, is sealed in a pair of light-transmissive glass substrates. For example, a polysilicon TFT is used as a switching element to modulate, in accordance with an applied image signal, the polarization direction of the polarized light beams emitted from the incident-side polarization plates.

The color light beams modulated in the liquid crystal devices 300R, 300G and 300B are synthesized by the cross dichroic prism 400.

The cross dichroic prism 400 is an optical element that forms a color image by synthesizing optical images modulated per color light emitted from the emission-side polarization plates. The cross dichroic prism 400 has a substantially square shape in plan view where four right-angled prisms are adhered together, and derivative multilayer films are formed at the substantially X-shaped interface where the right-angled prisms are adhered together. One of the substantially X-shaped derivative multilayer films reflects red light, and the other derivative multilayer film reflects blue light. The red light and the blue light are bent by these derivative multilayer films and aligned with the traveling direction of the green light, whereby the light beams of the three colors are synthesized.

The color image synthesized by the cross dichroic prism 400 is enlarged and projected onto the screen SCR by the projection optical system 420. Thus, an image is displayed on the screen SCR.

As described above, the projector 100 pertaining to the third exemplary embodiment is disposed with the illumination optical system 101 including the illumination device 10A, the liquid crystal devices 300R, 300G and 300B that modulate the light from the illumination optical system 101 in accordance with image information, and the projection optical system 420 that projects the light modulated by the liquid crystal devices 300R, 300G and 300B.

For this reason, according to the projector 100 pertaining to the third exemplary embodiment, as described above, the projector is inexpensive and has a light use efficiency that is high because the projector 100 is disposed with the illumination device 10A that is inexpensive and has a light use efficiency that is high.

Figure 5:
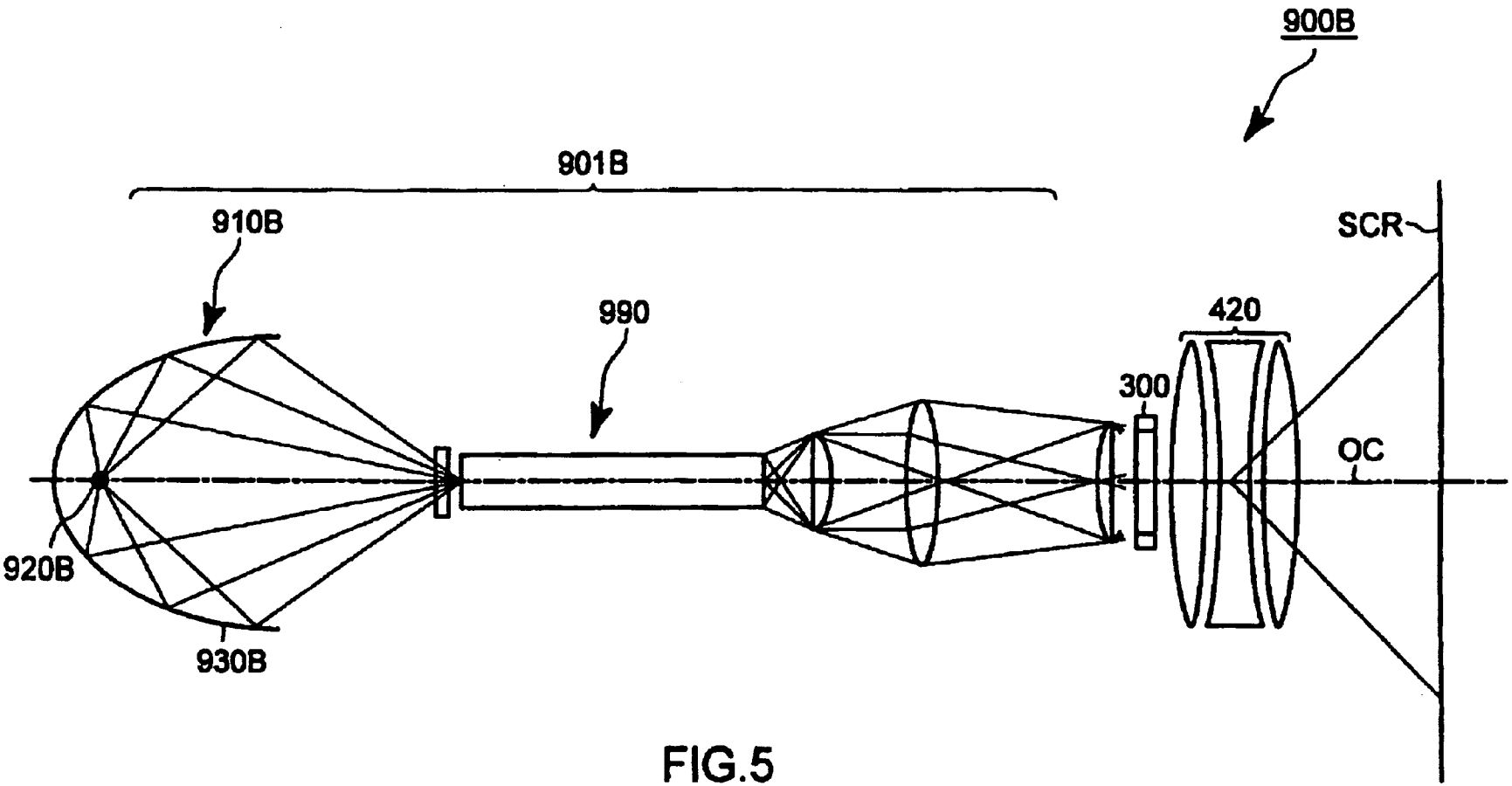
FIG. 5 is a schematic showing an example of an optical system of a projector using an ellipsoidal reflector.
Figure 6:
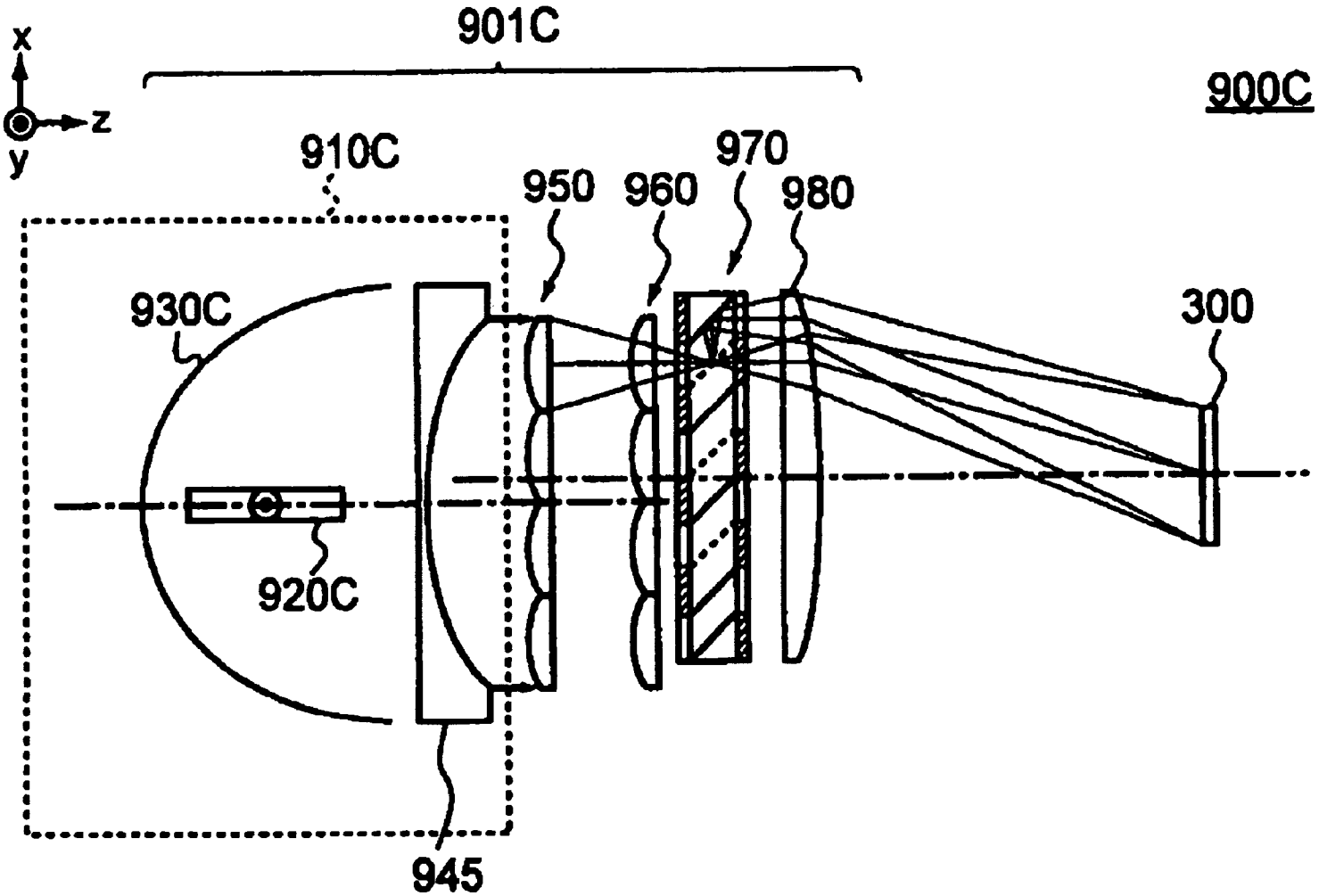
FIG. 6 is a schematic showing another example of an optical system of a projector using an ellipsoidal reflector.
Figure 7:
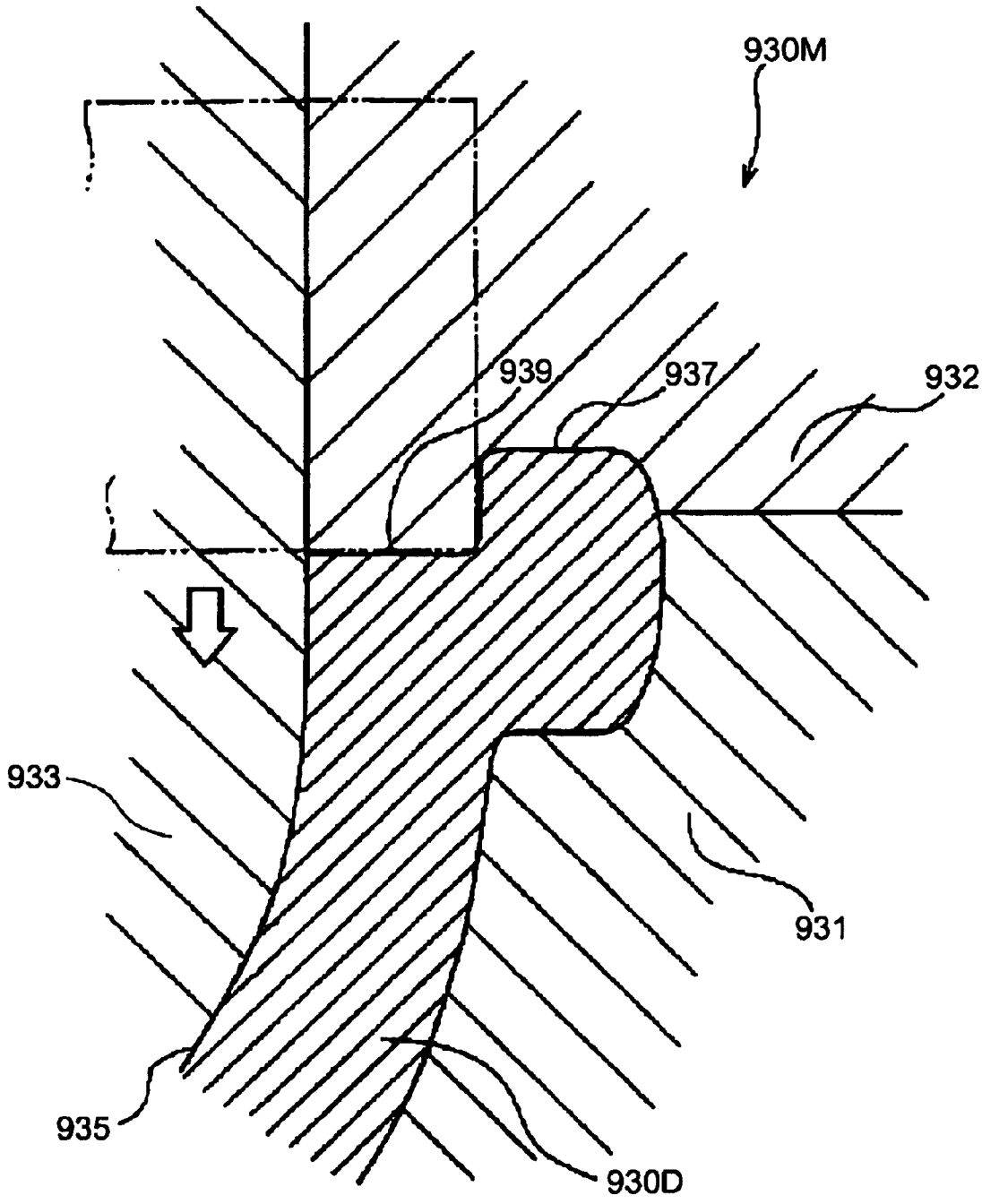
FIG.7 Related Art
FIG. 7 is a schematic showing a related art reflector manufacturing method for explanation.

The projector 100 pertaining to the third exemplary embodiment uses the illumination optical system 101 disposed with the integrator optical system 60 and the illumination device 10A including the reflector 30A manufactured by the reflector manufacturing method pertaining to the first exemplary embodiment. But the projector 100 can also use an illumination optical system 901B disposed with an illumination device 910B including an ellipsoidal reflector 930B including a concave surface configured by an ellipsoid of revolution as shown in FIG. 5 and an integrator optical system including an integrator rod 990. In a case where the illumination optical system 901B is used in the projector, similar to the case of the projector 100 pertaining to the third exemplary embodiment, the projector can be configured to be an inexpensive projector and have a light use efficiency that is high by using, in lieu of the ellipsoidal reflector 930B, the reflector manufactured by the reflector manufacturing method pertaining to the first exemplary embodiment.

Figure 8:
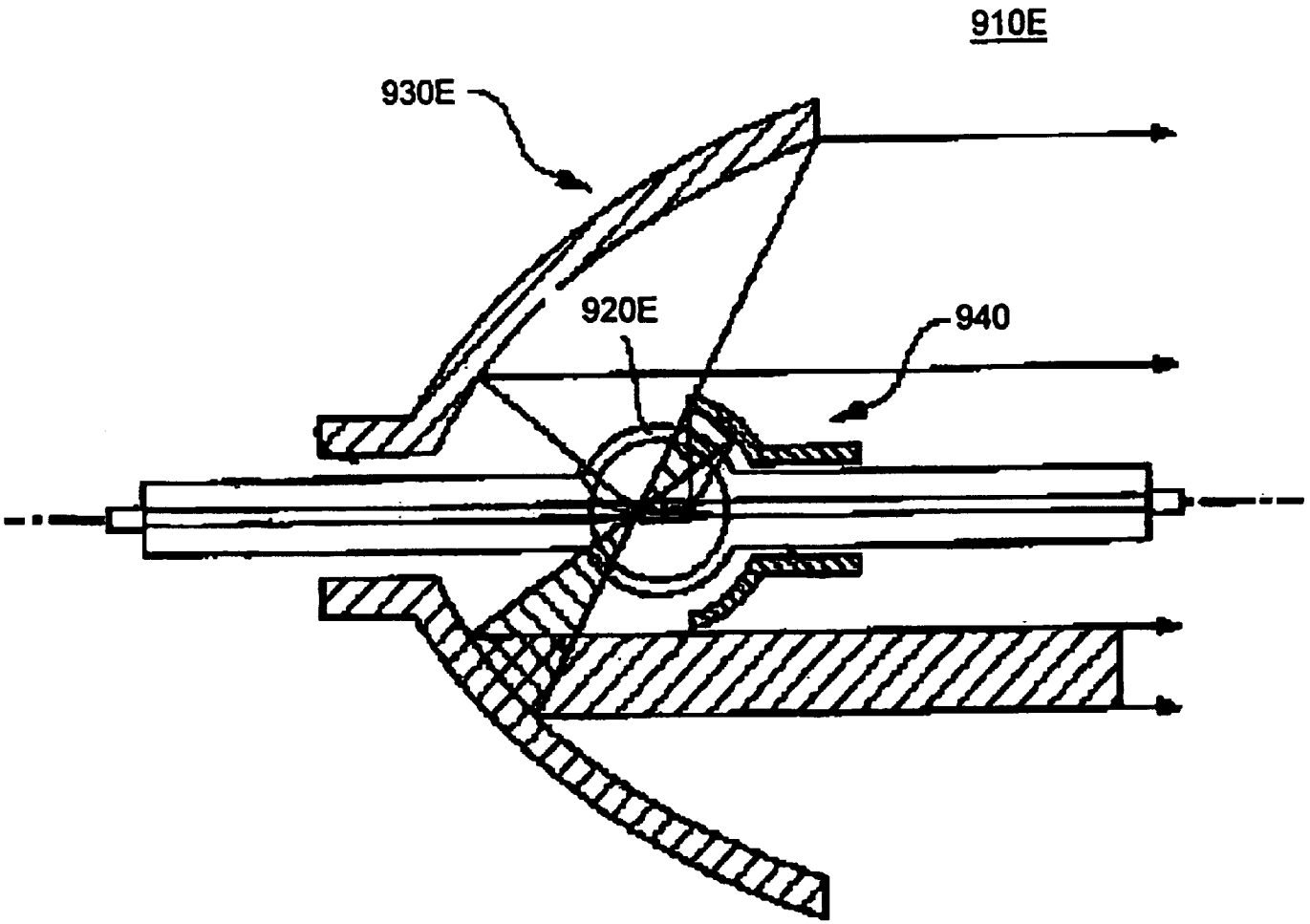
FIG. 8 is a schematic showing an illumination device including an auxiliary mirror.

Also, the projector 100 pertaining to the third exemplary embodiment used the illumination device 10A including the reflector 30A manufactured by the reflector manufacturing method pertaining to the first exemplary embodiment. But the projector can also use an illumination device 910E including an auxiliary mirror 940 and an ellipsoidal reflector 930E including a concave surface configured by an ellipsoid of revolution as shown in FIG. 8. In a case where the illumination device 910E is used in the projector, similar to the case of the projector 100 pertaining to the third exemplary embodiment, the projector can be configured to be an inexpensive projector and have a light use efficiency that is high by using, in lieu of the auxiliary mirror 940, the auxiliary mirror 40 (see FIG. 2(b-4)) manufactured by the auxiliary mirror manufacturing method pertaining to the second exemplary embodiment. In this case, the projector can be configured to be an inexpensive projector and have a light use efficiency that is high by using, in lieu of the ellipsoidal reflector 910E, the reflector manufactured by the reflector manufacturing method pertaining to the first exemplary embodiment. In an illumination device including such an auxiliary mirror, because the light emitted to the illuminated region from the light-emitting portion of the arc tube is reflected towards the reflector by the auxiliary mirror, it is not necessary to set the size of the reflector to a size that covers the illuminated region end portion of the arc tube, and the reflector can be made compact. As a result, the illumination device can be made compact.

A method of manufacturing reflective mirror, an illumination device and a projector of an exemplary aspect of the invention have been described on the basis of the preceding embodiments. But the present invention is not limited to these exemplary embodiments. It is possible to implement the invention in various kinds of modes within a range that does not deviate from the gist thereof. For example, the following modifications are also possible.

The illumination device described in the first exemplary embodiment is an illumination device including the reflector manufactured by gas pressure molding, and the illumination device described in the second exemplary embodiment is an illumination device including an auxiliary mirror manufactured by gas pressure molding, but the invention is not limited thereto. The illumination device of an exemplary aspect of the invention may also be an illumination device including, in addition to an auxiliary mirror manufactured by gas pressure molding, a reflector manufactured by gas pressure molding.

In the preceding exemplary embodiments, an illumination device disposed with the reflector manufactured by the reflector manufacturing method pertaining to the first exemplary embodiment and/or the auxiliary mirror manufactured by the auxiliary mirror manufacturing method pertaining to the second exemplary embodiment was disposed in a projector, but the invention is not limited thereto. The illumination device may also be disposed in another optical device.

In the projector pertaining to the third exemplary embodiment, a case was described where an illumination device disposed with the reflector manufactured by the reflector manufacturing method pertaining to the first exemplary embodiment and/or the auxiliary mirror manufactured by the auxiliary mirror manufacturing method pertaining to the second exemplary embodiment was used in a front type projector that projects a projection image from the observing side, but the invention is also applicable to a rear type projector that projects a projection image from the side opposite from the observing side.

In the projector pertaining to the third exemplary embodiment, a projector using the three liquid crystal devices 300R, 300G and 300B was described as an example, but the invention is also applicable to a projector disposed with one, two, or four or more liquid crystal devices.

In the projector pertaining to the third exemplary embodiment, a case was described where the illumination device of an exemplary aspect of the invention was applied to a transmissive type reflector. But it is also possible to apply the invention to a reflective type projector. Here, "transmissive type" means a type where an electro-optical modulation device serving as light modulating means transmits light, such as in a transmissive type liquid crystal device. "Reflective type" means a type where an electro-optical modulation device serving as light modulating means reflects light, such as in a reflective type liquid crystal device. Even in a case where the invention is applied to a reflective type projector, effects that are substantially the same as those of a transmissive type projector can be obtained.

The projector pertaining to the third exemplary embodiment uses the liquid crystal devices 300R, 300G and 300B as electro-optical modulation devices, but the invention is not limited thereto. It suffices as long as the electro-optical modulation device is one that usually modulates incident light in accordance with image information, and a micromirror type optical modulation device may be used. For example, a DMD (digital micromirror device) can be used as the micromirror type optical modulation device.

The invention claimed is:

1. A *method for manufacturing a* reflective mirror [manufacturing method for manufacturing a reflective mirror] used in an illumination device including an arc tube [including] *having* a light-emitting portion and a reflective mirror [including] *having* a reflective surface that reflects light from the light-emitting portion in a predetermined direction, the method comprising:

[a first step of forming] *heating* a tube [by heating a tube including] *comprising* a material of the reflective mirror, thereafter putting the tube in a form block, applying internal pressure with an inert gas to cause a center portion of the tube to expand, so that part of an inner surface of the expanded center portion includes a shape corresponding to the reflective surface of the reflective mirror; *the expanded center portion being continuous with a part of a tube portion that includes a shape corresponding to a fixing portion where the arc tube is fixed to the reflective mirror;*

[a second step of] cutting the tube at the *expanded* center portion to form a reflective mirror member; and

[a third step of] forming a reflective layer on [an inner surface] *the reflective surface* of the reflective mirror member.

2. The [reflective mirror manufacturing method of] *method according to* claim 1, further [including] *comprising*:

[in the first step,] forming the tube so that it has a shape where two reflective mirror members mutually face each other, *when the center portion of the tube expands by applying internal pressure with an inert gas,* and

[in the second step,] forming the two reflective mirror members, *when the tube cutting at the expanded center portion*.

3. The [reflective mirror manufacturing method of] *method according to* claim 1, the reflective mirror being a reflective mirror disposed with an effective reflective surface in a range from a portion of at least 40° with respect to an optical axis of the reflective mirror, using a light emission center of the light-emitting portion as a reference, to an open end portion of the reflective mirror.

4. An illumination device, comprising:

an arc tube including a light-emitting portion; and a reflector including a reflective surface without mold marks that reflects light from the light-emitting portion in a predetermined direction, the reflector being a reflector manufactured by a reflector manufacturing method comprising:

[a first step of forming] *heating* a tube [by heating a tube including] *comprising* a material of the reflector, thereafter putting the tube in a form block, applying internal pressure with an inert gas to cause a center portion of the tube to expand, so that part of an inner surface of the expanded center portion includes a shape corresponding to the reflective surface of the reflector; *the expanded center portion being continuous with a part of a tube portion that includes a shape corresponding to a fixing portion where the arc tube is fixed to the reflector;*

[a second step of] cutting the tube at the *expanded* center portion to form a reflector member; and

[a third step of] forming a reflective layer on [an inner surface] *the reflective surface* of the reflector member.

5. A projector, comprising:

[the] *an* illumination optical system including the illumination device of claim 4;

an electro-optical modulation device that modulates light from the illumination optical system in accordance with image information; and a projection optical system that projects the light modulated by the electro-optical modulation device.

6. The illumination device [of] *according to* claim 4, the reflector being a reflector manufactured by the reflector manufacturing method where

[in the first step,] forming the tube so that it has a shape where two reflector members mutually face each other, *when the center portion of the tube expands by applying internal pressure with an inert gas,* and

[in the second step,] forming the two reflector members, *when the tube cutting at the expanded center portion*.

7. A projector, comprising:

an illumination optical system including the illumination device of claim 6;

an electro-optical modulation device that modulates light from the illumination optical system in accordance with image information; and a projection optical system that projects the light modulated by the electro-optical modulation device.

8. The illumination device [of] *according to* claim 4, the reflector being a reflector disposed with an effective reflective surface in a range from a portion of at least 40° with respect to an optical axis of the reflector, using a light emission center of the light-emitting portion as a reference, to an open end portion of the reflector.

9. A projector, comprising:

an illumination optical system including the illumination device of claim 8;

an electro-optical modulation device that modulates light from the illumination optical system in accordance with image information; and a projection optical system that projects the light modulated by the electro-optical modulation device.

10. An illumination device, comprising:

an arc tube including a light-emitting portion;

a reflector including a reflective surface without mold marks that reflects light from the light-emitting portion to an illuminated region; and an auxiliary mirror that is disposed facing the reflector with the light-emitting portion sandwiched therebetween, the auxiliary mirror including a reflective surface without mold marks and which reflects part of the light emitted from the light-emitting portion towards the light-emitting portion, the auxiliary mirror being an auxiliary mirror manufactured by an auxiliary mirror manufacturing method [including] *comprising*:

[a first step of forming] *heating* a tube [by heating a tube including] *comprising* a material of the auxiliary mirror, thereafter putting the tube in a form block, applying internal pressure with an inert gas to cause a center portion of the tube to expand, so that part of an inner surface of the expanded center portion includes a shape corresponding to the reflective surface of the auxiliary mirror, *the expanded center portion being continuous with a part of a tube portion that includes a shape corresponding to a fixing portion where the arc tube is fixed to the auxiliary mirror*;

[a second step of] cutting the tube at the *expanded* center portion to form an auxiliary mirror member; and

[a third step of] forming a reflective layer on [an inner surface] *the reflective surface* of the auxiliary mirror member.

11. A projector, comprising:

an illumination optical system including the illumination device of claim 10;

an electro-optical modulation device that modulates light from the illumination optical system in accordance with image information; and a projection optical system that projects the light modulated by the electro-optical modulation device.

12. The illumination device [of] *according to* claim 10, the auxiliary mirror being an auxiliary mirror manufactured by the auxiliary mirror manufacturing method where

[in the first step,] *forming* the tube [is formed] so that it has a shape where two auxiliary mirror members mutually face each other, *when the center portion of the tube expands by applying internal pressure with an inert gas,* and

[in the second step,] *forming* the two auxiliary mirror members [are formed], *when the tube cutting at the expanded center portion*.

13. A projector, comprising:

an illumination optical system including the illumination device of claim 12;

an electro-optical modulation device that modulates light from the illumination optical system in accordance with image information; and a projection optical system that projects the light modulated by the electro-optical modulation device.

14. The illumination device [of] *according to* claim 10, the auxiliary mirror being an auxiliary mirror disposed with an effective reflective surface in a range from a portion of at least 40° with respect to an optical axis of the auxiliary mirror, using a light emission center of the light-emitting portion as a reference, to an open end portion of the auxiliary mirror.

15. A projector, [including] *comprising*:

an illumination optical system including the illumination device of claim 14;

an electro-optical modulation device that modulates light from the illumination optical system in accordance with image information; and a projection optical system that projects the light modulated by the electro-optical modulation device.

16. The illumination device [of] *according to* claim 10, the reflector being a reflector manufactured by a reflector manufacturing method [including] *comprising*:

[a first step of forming a] *heating a* tube [by heating a tube including] *comprising* a material of the reflector, thereafter putting the tube in a form block, applying internal pressure with an inert gas to cause a center portion of the tube to expand, so that part of an inner surface of the expanded center portion includes a shape corresponding to the reflective surface of the reflector, *the expanded center portion being continuous with a part of a tube portion that includes a shape corresponding to a fixing portion where the arc tube is fixed to the reflector*;

[a second step of] cutting the tube at the *expanded* center portion *being continuous with a part of a tube portion that includes a shape corresponding to a fixing portion where the arc tube is fixed to the reflector;*

*cutting the tube at the expanded center portion* to form a reflector member; and

[a third step of] forming a reflective layer on [an inner surface] *the reflective surface* of the reflector member.

17. A projector, comprising:

an illumination optical system including the illumination device of claim 16;

an electro-optical modulation device that modulates light from the illumination optical system in accordance with image information; and a projection optical system that projects the light modulated by the electro-optical modulation device.

* * * * *